(12) United States Patent
Chen

(10) Patent No.: US 8,539,265 B2
(45) Date of Patent: Sep. 17, 2013

(54) POWER PROTECTION SYSTEM FOR POWER SUPPLY

(75) Inventor: Chun-Po Chen, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 347 days.

(21) Appl. No.: 13/036,050

(22) Filed: Feb. 28, 2011

(65) Prior Publication Data

US 2012/0191987 A1    Jul. 26, 2012

(30) Foreign Application Priority Data

Jan. 26, 2011   (TW) .............................. 100102973 A

(51) Int. Cl.
| | |
|---|---|
| G06F 1/00 | (2006.01) |
| H02H 3/08 | (2006.01) |
| H02M 7/5383 | (2007.01) |
| G01R 19/00 | (2006.01) |
| G06F 11/00 | (2006.01) |

(52) U.S. Cl.
USPC .............. 713/300; 361/93.1; 363/74; 702/64; 714/14; 714/22

(58) Field of Classification Search
USPC ........... 713/300; 361/93.1; 363/74; 702/64; 714/14, 22
See application file for complete search history.

(56) References Cited

U.S. PATENT DOCUMENTS

| 7,813,094 B1 * | 10/2010 | Sherwin ....................... 361/93.1 |
| 8,159,801 B2 * | 4/2012 | Fasth et al. .................... 361/93.8 |
| 8,230,151 B2 * | 7/2012 | Hou et al. ...................... 710/307 |

\* cited by examiner

*Primary Examiner* — Stefan Stoynov
(74) *Attorney, Agent, or Firm* — Altis Law Group, Inc.

(57) ABSTRACT

A power protection system for a power supply includes a power unit, a microcontroller, a connector, a current sensing resistor, a hot-swap controller, and an electronic switch having first to third terminals. The first terminal is connected to the connector through the current sensing resistor. The second terminal is connected to the power unit. The third terminal is connected to a control pin of the hot-swap controller. First and second sensing pins of the hot-swap controller are respectively connected to two ends of the current sensing resistor. A monitoring pin of the hot-swap controller is connected to the second terminal. A clock pin and a data pin of the hot-swap controller are connected to two terminals of the microcontroller.

4 Claims, 1 Drawing Sheet

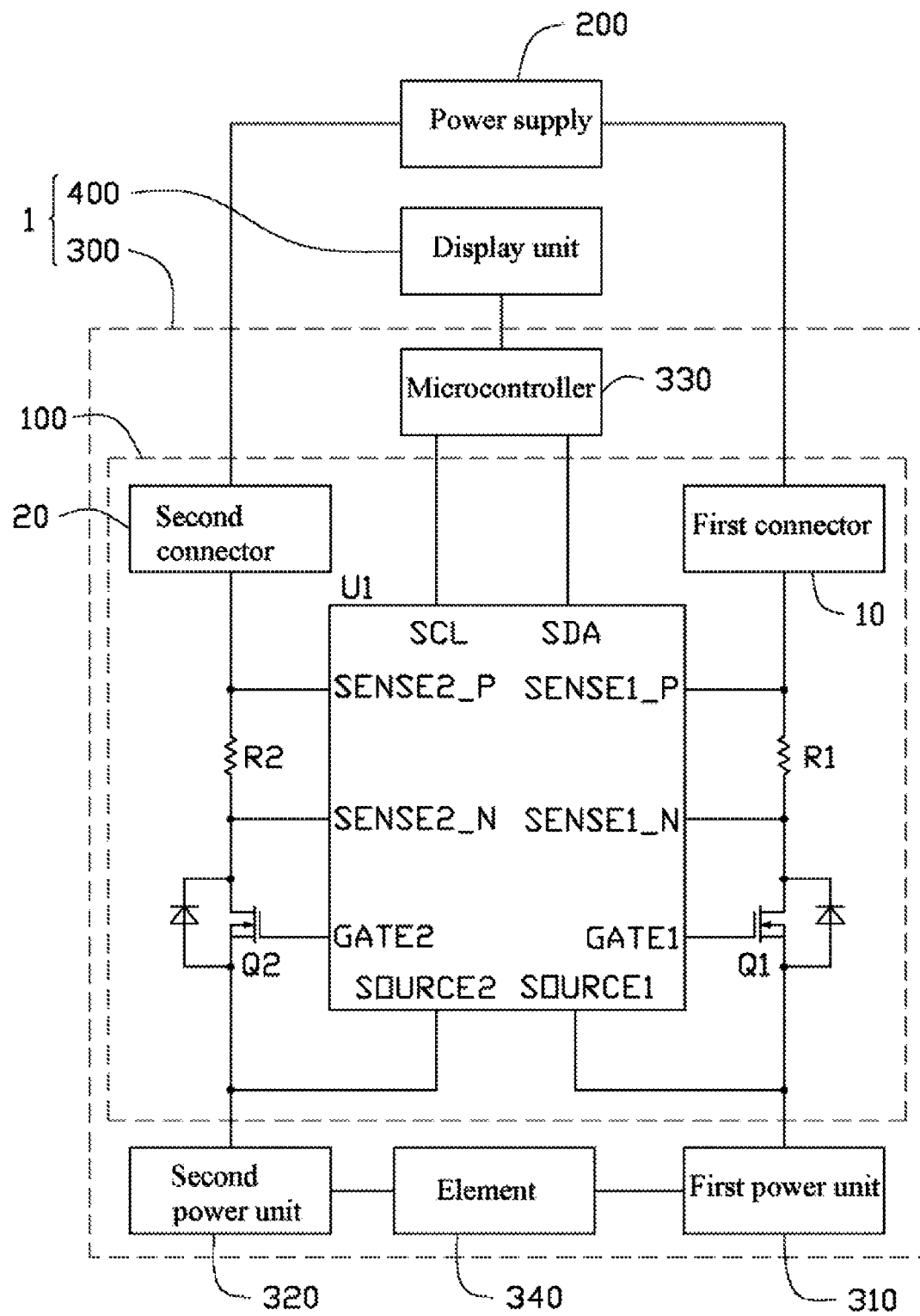

POWER PROTECTION SYSTEM FOR POWER SUPPLY

BACKGROUND

1. Field of the Invention

The present disclosure relates to a power protection system for a power supply.

2. Description of Related Art

A power supply of a computer usually has a plurality of power outputs, a maximum current value corresponding to each power output cannot exceed a rated current value, such as a rated current value of a 12 volt (V) power output of the power supply is 18 amperes. If the maximum current of the 12V power output of the power supply is greater than its rated current value, the power supply will automatically power off, which will cause the motherboard of the computer to power off. Moreover, data of the computer will be lost when the data is not stored. Therefore, there is room for improvement in the art.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments. Moreover, in the drawing, like reference numerals designate corresponding parts throughout the several views.

The drawing is a circuit diagram of a power protection system for a power supply in accordance with an exemplary embodiment of the present disclosure.

DETAILED DESCRIPTION

The disclosure, including the drawing, is illustrated by way of example and not by limitation. It should be noted that references to "an" or "one" embodiment in this disclosure are not necessarily to the same embodiment, and such references mean at least one.

Referring to the drawing, a power protection system 1 for a power supply 200 in accordance with an exemplary embodiment includes a motherboard 300, and a display unit 400. The motherboard 300 includes a power protection apparatus 100, a first power unit 310, a second power unit 320, a microcontroller 330, and elements 340. The elements 340 of the motherboard 300 are known elements of general motherboards. The first power unit 310 and the second power unit 320 are configured to provide voltages to the elements 340 of the motherboard 300.

The power protection apparatus 100 includes a first connector 10, a second connector 20, a hot-swap controller U1, two current sensing resistors R1 and R2, and two electronic switches, such as n-channel field effect transistors (FETs) Q1 and Q2. The first connector 10 is electrically connected to a first power output of the power supply 200, such as a P12VA_IN output, to receive 12 volts (V) from the power supply 200. The second connector 20 is electrically connected to a second power output of the power supply 200, such as a P12VB_IN output, to receive a 12V from the power supply 200. The microcontroller 330 is configured to store a preset current value of the hot-swap controller U1 and a rated current value of the power supply 200 in an inside storage unit (not shown) of the power supply 200. The preset current value of the hot-swap controller U1 is less than the rated current value of the power supply 200. For example, the rated current value of the 12V power output of the power supply 200 is 18 amperes, thus, the preset current value of the hot-swap controller U1 may be 16 amperes.

A drain of the FET Q1 is connected to the first connector 10 through the current sensing resistor R1. A source of the FET Q1 is connected to the first power unit 310 of the motherboard 300. A gate of the FET Q1 is connected to a control pin GATE1 of the hot-swap controller U1. Sensing pins SENSE1_P and SENSE1_N of the hot-swap controller U1 are respectively connected to two ends of the current sensing resistor R1. A monitoring pin SOURCE1 of the hot-swap controller U1 is connected to the source of the FET Q1. A clock pin SCL and a data pin SDA of the hot-swap controller U1 are respectively connected to two terminals of the microcontroller 330. The microcontroller 330 is also connected to the display unit 400. A drain of the FET Q2 is connected to the second connector 20 through the current sensing resistor R2. A source of the FET Q2 is connected to the second power unit 320 of the motherboard 300. A gate of the FET Q2 is connected to a control pin GATE2 of the hot-swap controller U1. Sensing pins SENSE2_P and SENSE2_N of the hot-swap controller U1 are respectively connected to two ends of the current sensing resistor R2. A monitoring pin SOURCE2 of the hot-swap controller U1 is connected to the source of the FET Q2. In other embodiments, the electronic switches may be npn transistors. The display unit 400 displays a power output of the power supply 200 and displays a percentage, which is a real current value to a rated current value. When the percentage is equal to 100%, the power supply 200 will be powered off.

In use, first and second power outputs of the power supply 200 are respectively connected to the first connector 10 and the second connector 20 of the motherboard 300. The power supply 200 and the motherboard 300 are powered on. The rated current value of the 12V power output of the power supply 200 is 18 amperes. The preset current value of the hot-swap controller U1 is configured to be 16 amperes. The first power output of the power supply 200 is loaded to the current sensing resistor R1 through the first connector 10. The hot-swap controller U1 acquires a first voltage from the two ends of the current sensing resistor R1 through the sensing pins SENSE1_P and SENSE1_N and outputs the first voltage to the microcontroller 330. The microcontroller 330 acquires a first current value corresponding to the first voltage received from the hot-swap controller U1 and compares the first current value with the preset current value of the hot-swap controller U1 stored in the inside storage unit of the microcontroller 330. If the first current value is less than the preset current value of the hot-swap controller U1, the microcontroller 330 outputs a first control signal to control the control pin GATE1 of the hot-swap controller U1 to output a high level signal. The FET Q1 is turned on. The first power output of the power supply 200 is output to the first power unit 310, to provide voltages to the elements 340 of the motherboard 300. At the same time, the microcontroller 330 controls the display unit 400 to display the first power output of the power supply 200 and display a percentage, which is the first current value to the rated current value.

If the first current value acquired from the microcontroller 330 is greater than the preset current value of the hot-swap controller U1 and less than the rated current value of the power supply 200, the microcontroller 330 outputs a second control signal to control the control pin GATE1 of the hot-swap controller U1 to output a low level signal. The FET Q1 is turned off. The first power output of the power supply 200 is not output to the first power unit 310. At the same time, the microcontroller 330 controls the display unit 400 to display the first power output of the power supply 200 and output an warning sign, such as an exclamation point, for warning that the first power output of the power supply 200 will be cut off. Therefore, when the first current value from the first power output of the power supply 200 is greater than the preset current value of the hot-swap controller U1 and less than the rated current value of the power supply 200, the hot-swap controller U1 will cut off the first power output of the power supply 200. Thus, it prevents the power supply 200 from automatically powering off.

The second power output of the power supply 200 is loaded to the current sensing resistor R2 through the second connector 20. The hot-swap controller U1 acquires a second voltage from two ends of the current sensing resistor R2 through the sensing pins SENSE2_P and SENSE2_N and outputs the second voltage to the microcontroller 330. The microcontroller 330 acquires a second current value corresponding to the second voltage received from the hot-swap controller U1 and compares the second current value with the preset current value of the hot-swap controller U1 stored in the inside storage unit of the microcontroller 330. If the second current value is less than the preset current value of the hot-swap controller U1, the microcontroller 330 outputs a third control signal to control the control pin GATE2 of the hot-swap controller U1 to output a high level signal. The FET Q2 is turned on. The second power output of the power supply 200 is output to the second power unit 320, to provide voltages to the elements 340 of the motherboard 300. At the same time, the microcontroller 330 controls the display unit 400 to display the second power output of the power supply 200 displaying a percentage, which is the second current value to a rated current value.

If the second current value acquired from the microcontroller 330 is greater than the preset current value of the hot-swap controller U1 and less than the rated current value of the power supply 200, the microcontroller 330 outputs a fourth control signal to control the control pin GATE2 of the hot-swap controller U1 to output a low level signal. The FET Q2 is turned off. The second power output of the power supply 200 is not output to the second power unit 320. At the same time, the microcontroller 330 controls the display unit 400 to display the second power output of the power supply 200 and output a warning sign, such as an exclamation point, for warning that the second power output of the power supply 200 will be cut off. Therefore, when the second current value from the second power output of the power supply 200 is greater than the preset current value of the hot-swap controller U1 and less than the rated current value of the power supply 200, the hot-swap controller U1 will cut off the second power output of the power supply 200. Thus, it prevents the power supply 200 from automatically powering off.

In other embodiments, a plurality of power protection apparatus 100 can be set on the motherboard 300, to be connected to other power outputs of the power supply 200.

The power protection system 1 can prevent the power supply 200 from automatically powering off when the current value of a power output of the power supply 200 is greater than the rated current value of the power supply 200.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power protection system for a power supply, the power protection system comprising:
 a motherboard comprising:
  a first power unit to provide voltages to elements of the motherboard;
  a power protection apparatus comprising:
   a first connector connected to a first power output of the power supply;
   a first current sensing resistor;
   a hot-swap controller comprising first and second sensing pins respectively connected to two ends of the first current sensing resistor, a monitoring pin, a clock pin, a first control pin, and a data pin; and
   a first electronic switch comprising first to third terminals, wherein the first terminal is connected to the first connector through the first current sensing resistor, the second terminal is connected to the first power unit and the monitoring pin of the hot-swap controller, the third terminal is connected to the first control pin of the hot-swap controller; and
 a microcontroller to store a preset current value of the hot-swap controller and store a related current value of the power supply, two terminals of the microcontroller respectively connected to the clock pin and data pin of the hot-swap controller;
 wherein the hot-swap controller acquires a first voltage from two ends of the first current sensing resistor through the first and the second sensing pins and outputs the first voltage to the microcontroller, the microcontroller acquires a first current value corresponding to the first voltage from the hot-swap controller and compares the first current value with the preset current value of the hot-swap controller, upon a condition that the first current value is less than the preset current value, the microcontroller outputs a first control signal to control the first control pin of the hot-swap controller to output a high level signal, the first electronic switch is turned on, the first power output of the power supply is outputted to the first power unit, upon a condition that the first current value is greater than the preset current value of the hot-swap controller and less than the rated current value of the power supply, the microcontroller outputs a second control signal to control the first control pin of the hot-swap controller to output a low level signal, the first electronic switch is turned off, the first power output of the power supply is not outputted to the first power unit.

2. The power protection system as claimed in claim 1, wherein the motherboard further comprises a second power unit to provide voltage to the elements of the motherboard, the power protection apparatus further comprises a second connector, a second current sensing resistor, and a second electronic switch, wherein the second connector is connected to a second power output of the power supply, a first terminal of the second electronic switch is connected to the second connector through the second current sensing resistor, a second terminal of the second electronic switch is connected to the second power unit, a third terminal of the second electronic switch is connected to a second control pin of the hot-swap controller, third and fourth sensing pins of the hot-swap controller are respectively connected to two ends of the second current sensing resistor, a second monitoring pin of the hot-swap controller is connected to the second terminal of the second electronic switch, wherein the hot-swap controller acquires a second voltage from two ends of the second current sensing resistor through the third and the fourth sensing pins and outputs the second voltage to the microcontroller, the microcontroller acquires a second current value corresponding to the second voltage from the hot-swap controller and compares the second current value with the preset value of the hot-swap controller, upon a condition that the second current value is less than the preset current value, the microcontroller outputs a third control signal to control the second control pin of the hot-swap controller to output a high level signal, the second electronic switch is turned on, the second power output of the power supply is outputted to the second power unit, upon a condition that the second current value is greater than the preset current value and less than the rated current value, the microcontroller outputs a fourth control signal to control the second control pin of the hot-swap controller to output a low level signal, the second electronic switch is turned off, the second power output of the power supply is not outputted to the second power unit.

3. The power protection system as claimed in claim 2, wherein the first and the second electronic switches are n-channel field effect transistors, the first to third terminals of the first and the second electronic switches correspond to drains, sources, and gates, respectively, of the field effect transistors.

4. The power protection system as claimed in claim 1, further comprising a display unit connected to the microcontroller, wherein the display unit displays the power output of the power supply and displays a percentage, which is each of the first and second current values to the rated current value.

\* \* \* \* \*